US006868523B1

United States Patent
Dejaeger

(10) Patent No.: US 6,868,523 B1
(45) Date of Patent: Mar. 15, 2005

(54) AUDIO/VISUAL METHOD OF BROWSING WEB PAGES WITH A CONVENTIONAL TELEPHONE INTERFACE

(75) Inventor: Wilfried E. Y. Dejaeger, Brussels (BE)

(73) Assignee: NCR Corporation, Dayton, OH (US)

( * ) Notice: Subject to any disclaimer, the term of this patent is extended or adjusted under 35 U.S.C. 154(b) by 909 days.

(21) Appl. No.: 09/640,035

(22) Filed: Aug. 16, 2000

(51) Int. Cl.$^7$ .............................................. G06F 3/14
(52) U.S. Cl. .................. 715/501.1; 715/513; 345/760; 704/246
(58) Field of Search .......................... 715/501.1, 513; 345/760; 704/246, 251; 379/68

(56) References Cited

U.S. PATENT DOCUMENTS

| | | | |
|---|---|---|---|
| 4,947,028 A | 8/1990 | Gorog | 235/38 D |
| 5,283,731 A | 2/1994 | Lalonde et al. | 705/1 |
| 5,634,053 A | 5/1997 | Noble et al. | 707/4 |
| 5,729,741 A | 3/1998 | Liaguno et al. | 707/104.1 |
| 5,832,459 A | 11/1998 | Cameron et al. | 705/26 |
| 5,845,261 A | 12/1998 | McAbian | 705/26 |
| 5,890,138 A | 3/1999 | Godin et al. | 705/26 |
| 5,897,622 A | 4/1999 | Blinn et al. | 705/26 |
| 5,897,623 A | 4/1999 | Fein et al. | 705/27 |
| 5,915,001 A * | 6/1999 | Uppaluru | 379/88.22 |
| 6,115,686 A * | 9/2000 | Chung et al. | 704/260 |
| 6,282,511 B1 * | 8/2001 | Mayer | 704/270 |
| 6,418,199 B1 * | 7/2002 | Perrone | 379/88.01 |

OTHER PUBLICATIONS

Oliver, D., "Netscape 2 Unleashed", Sams.net, 1996, pp. 20–26.*

Hemphill et al, "Surfing The Web by Voice", ACM, 11/95, pp. 1–11.*

* cited by examiner

Primary Examiner—Cesar B Paula
(74) Attorney, Agent, or Firm—Gregory A. Welte; Priest & Goldstein, PLLC

(57) ABSTRACT

A system which presents a common interface over different communication links. If a party contacts an organization through the organization's web site, a sequence of options is presented to the party. If another party contacts an organization through a telephone call, a computer answers, and presents the same options.

9 Claims, 4 Drawing Sheets

AUDIO/VISUAL METHOD OF BROWSING WEB PAGES WITH A CONVENTIONAL TELEPHONE INTERFACE

The invention concerns an approach usable by a central computer server for communicating with multiple devices of different types.

BACKGROUND OF THE INVENTION

In the economically developed countries, it is common for people to execute transactions by computer, frequently without the involvement of another person. For example, one can order merchandise by computer, transfer bank funds, examine account data for one's credit card, and so on.

However, in undertaking these transactions, one quickly realizes that different transactions, undertaken with different organizations, require one to deal with different computer interfaces. Further, even for a given type of transaction, undertaken with a single organization, the type of computer interface can be drastically different, depending on the communication medium utilized.

For example, purchasing shares of corporate stock from a broker can be done over the Internet, using a computer. The same purchase can be undertaken by telephone, wherein the purchaser identifies the purchases to be made using DTMF (Dual-Tone Multi-Frequency) signals issued by key-presses on the telephone. Two different interfaces are used for the same transaction.

Further, those interfaces can be expected to change, as time progresses.

Therefore, the proliferation of different computer interfaces, together with the fact that these different interfaces will change over time, are seen as inefficiencies in an economic system where efficiency should be a primary goal. Because of the proliferation, people are required to spend time learning a vast array of different interfaces, in order to interact with other parties in commercial transactions.

OBJECTS OF THE INVENTION

An object of the invention is to provide an improved system for executing transactions by computer.

A further object of the invention is to provide a system wherein a common interface is made available to all customers, as an overlay to an existing interface.

SUMMARY OF THE INVENTION

In one form of the invention, all options available to a customer are presented in groups of a predetermined size, such as three. The options are presented in spoken form, as well as in textual form. The dual presentation accommodates different communication media.

For example, if a customer is communicating through a device which supports both visual and audio transmission, then the customer will receive both forms of the options. If not, as, for example, if the customer is communicating by telephone, the customer will receive only the audio part.

Each option is assigned a number. The customer selects an option through the number, as by speaking it, pressing its counterpart on a keypad, or otherwise indicating the number. The process is repeated in this manner, until the transaction terminates.

An additional benefit to this approach is that it can be overlaid onto existing interfaces. For example, a standard "web page" can offer this type of interface as an option. With the overlay, customers can acclimate themselves to the new approach as often, or as seldom, as they choose.

It is expected that, once this protocol becomes standardized, people will feel comfortable undertaking a given transaction by telephone, by computer, by video conference, or by any other means of communication.

DETAILED DESCRIPTION OF THE INVENTION

Figure 1:
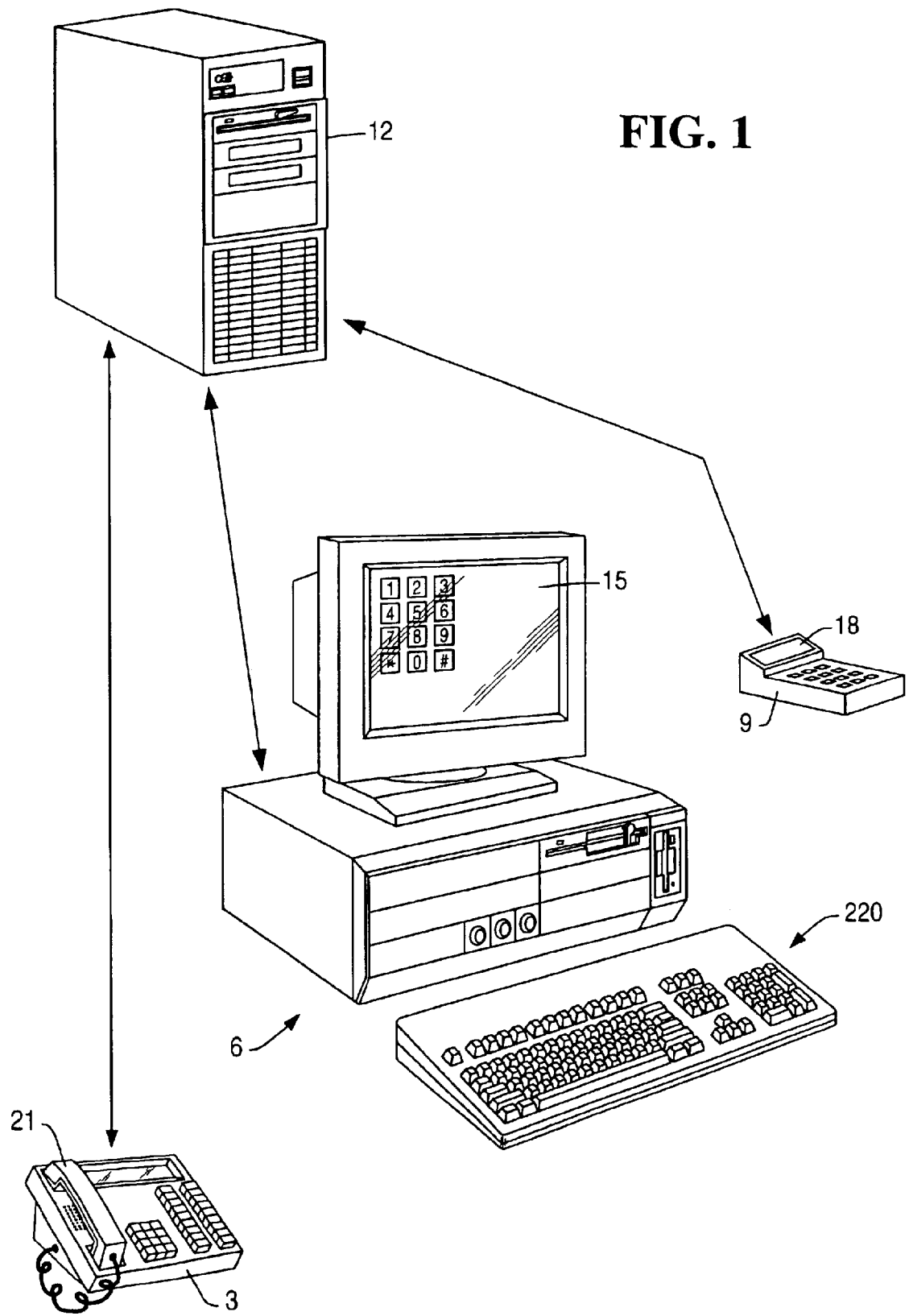
FIG. 1 illustrates three devices 6, 18, and 21 which communicate with a server 12.

FIG. 1 illustrates three devices: a telephone 3, a computer 6, and a Personal Digital Assistant 9, such as the product marketed as the Palm Pilot by 3Comm Corporation. These three devices are illustrative, without limitation, of the multitude of devices available to customers for communication with a computer server 12.

The devices share the common feature that they can all present human-understandable information to a user. For example, some devices can present the human-understandable information as visual text: the computer 6 can present text on its display 15, as can the PDA 9, on its display 18. Other devices can present the human-understandable information in audible form. For example, the telephone can present the human-understandable information in spoken form, through its handset 21.

Some devices, such as computer 6, if equipped with "multi-media" accessories, can present the human-understandable information in both visual and audible format.

A major difference between (1) the presentation of the human-understandable information in visual form on the displays 15 and 18, and (2) the presentation in audible form is the persistence of the information. The former stays resident on the screen 15 or 18, until it is removed. Thus, in the former case, numerous options can be displayed on the screen. The person can examine one option, then look to another option, and then return to the first. Since the person need not remember the options, a vast array of options can be presented.

However, when the human-language information is presented in audible format, the array of options must be limited, because the person listening must remember them, in order to make a decision.

Consequently, under the invention, when options are presented to a person, a limited number are presented in both cases, for consistency. The number is preferably "small," such an integral number ranging from two to ten. Three options is a preferred number.

Further, this limited number of options is presented in the format (audible or visual) suitable to the communication medium used. An example will illustrate.

Figure 2:
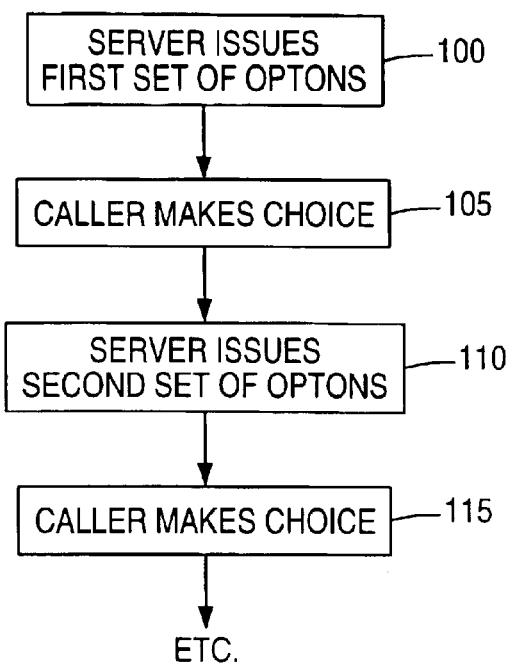
FIG. 2 is a flow chart illustrating procedures undertaken by one form of the invention.

Assume that a person wishes to order a pizza. If the person calls a pizza restaurant by telephone, the procedure illustrated in FIG. 2 is followed. After the person dials the restaurant's number, the person connects with the restaurant's computer server. As indicated in block 100, the server issues an audible message stating, "To order a pizza, press 1. To order hot sandwiches, press 2. To order cold sandwiches, press 3." The customer makes a choice, and presses the appropriate key, as indicated in block 105.

Assume that the customer pressed key 1, thereby selecting a pizza. As block 110 indicates, the server then issues a second set of options, which may be "To order a small pizza, press 1. To order a medium pizza, press 2. To order a large pizza, press 3."

The customer responds as indicated by block 115. This procedure continues until the pizza restaurant obtains sufficient information to prepare the order, at which time the customer disconnects from the server.

Figure 3:
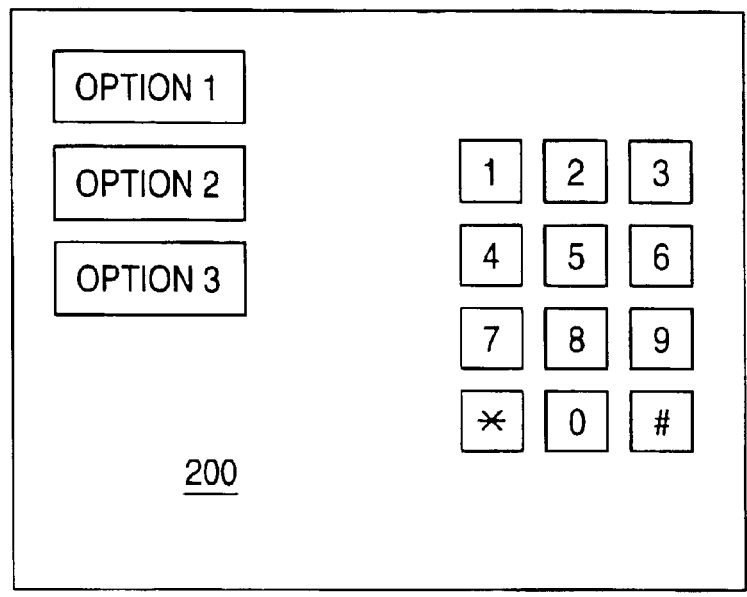
FIGS. 3 and 4 illustrate visual presentation of options, in groups of three.

If the customer, using a computer, connected to the restaurant's web site on the Internet, the customer would be presented with the display 200 shown in FIG. 3. That web site would present the same options as in FIG. 2, and in the same order, but visually. First, display 200 in FIG. 3 would present the options 1, 2, and 3, which are, respectively: "To order a pizza, press 1. To order hot sandwiches, press 2. To order cold sandwiches, press 3."

Figure 4:
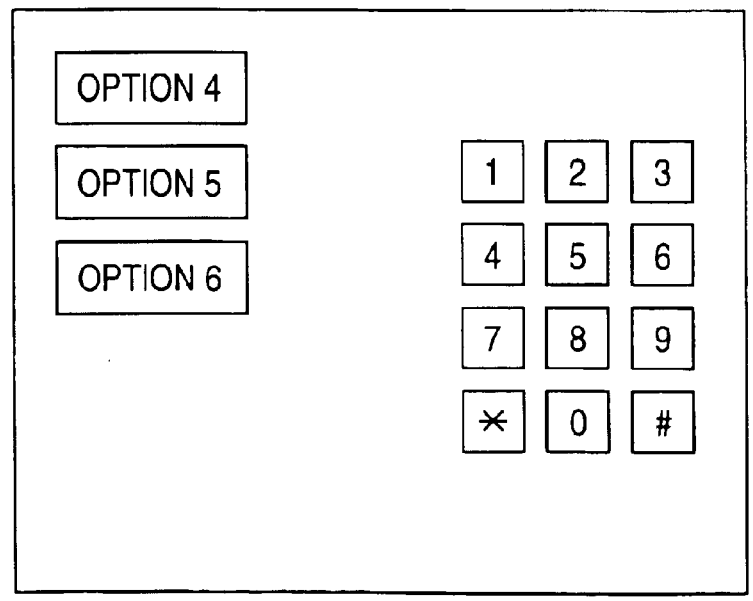

The customer would select an option, by using the displayed keypad 210, or by using the keyboard 220 shown in FIG. 1. Then the display 230 of FIG. 4 would be displayed, which presents the options 4, 5, and 6, which are, respectively, "To order a small pizza, press 1. To order a medium pizza, press 2. To order a large pizza, press 3."

Figure 5:
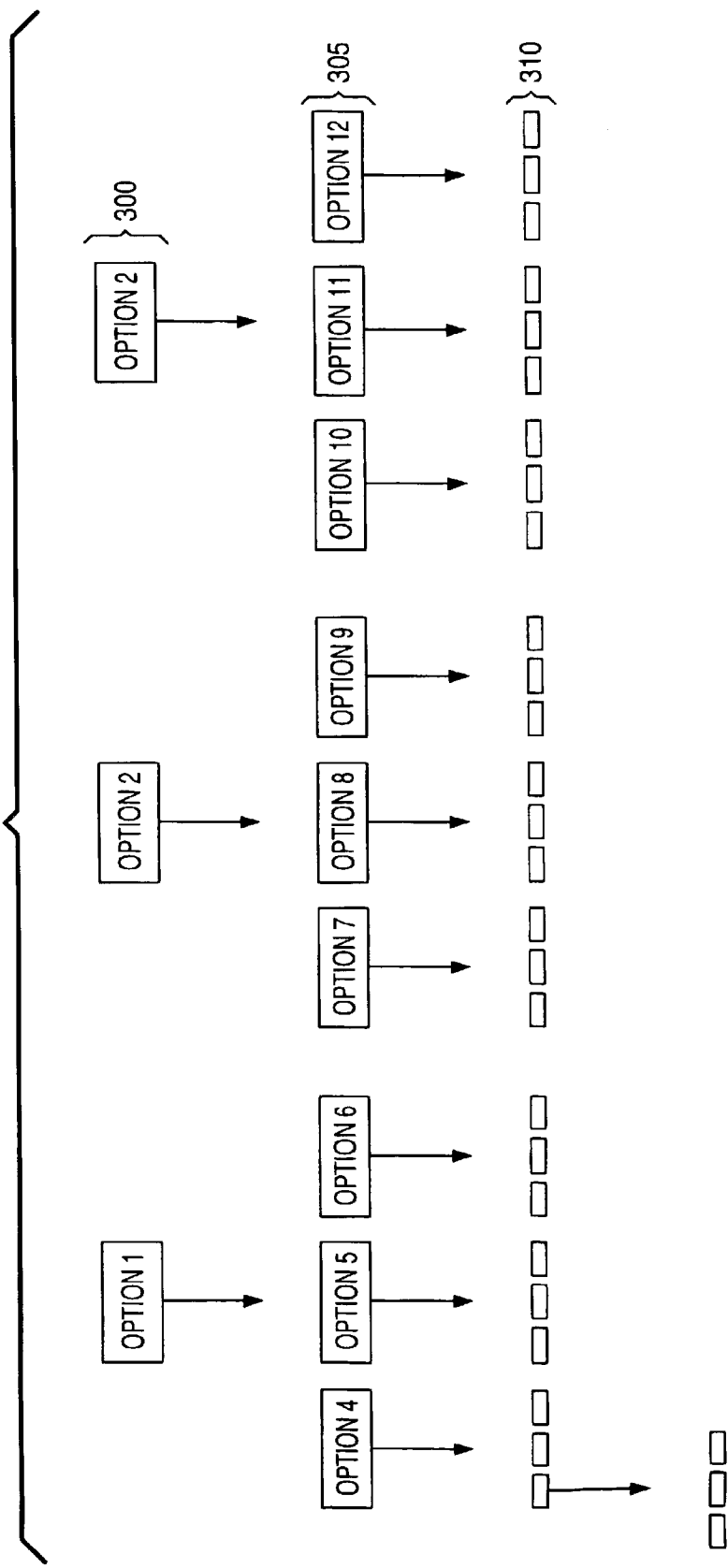
FIG. 5 illustrates a tree structure, wherein each option allows selection of three succeeding options.

In both cases, telephone and computer, the same flow chart of options is presented, and the same mode of selection is exercised by the customer. FIG. 5 illustrates an exemplary flow chart. Row 300 indicates the first set of three options. If the customer has called on a telephone, the customer selects one of the three options using a key-press. If the customer has contacted a web site using a computer, the customer selects one of the options by either using a numerical key on the customer's keyboard, or moving a mouse-pointer on the display, to select the option. In the latter case, the mouse pointer selects a number, displayed visually, on the display, as in FIG. 3.

The process continues in FIG. 5, as the customer advances through the flow chart.

Each option in the flow chart represents a branch point. In FIG. 5, each branch point is connected to three branches. Thus, if the pattern of FIG. 5 were continued, the following numbers of options would be present: three in level 300, nine in level 305, 27 in level 310, 81 in the next level, 243 in the next level, and continuing such that succeeding levels contain (3 raised to the power n) options, wherein n represents the nth level.

Therefore, in one form of the invention, an organization (the pizza restaurant in this simplified example) offers two types of interface to customers: an audio interface, and a video interface. The customer makes a de facto selection of interface type by selecting the communication medium used to contact the organization.

The organization presents the same pattern of options through both interfaces. The pattern follows a flow chart, of the type shown in FIG. 5. In the pattern, a small group of options is presented, such as three, each time. The group is "small," so that the average person can remember them, in order to decide among them. Selection of an option leads to presentation of another group of options, and so on, until the transaction completes.

One advantage of the invention is that the video display is perhaps more convenient to deal with. But familiarity with the video display leads immediately to familiarity with the audio display. That is, if a person practices using the video display, the person will automatically become familiar with the audio display.

Specifically, if a person practices ordering corporate stock from a broker using the video display, for example, that person will automatically become familiar with ordering stock by telephone.

Additional Considerations

1. At each level in the flow chart, such as in row 300 in FIG. 5, the customer can be presented two additional options. However, these options are standardized navigation options, and, once a customer has heard them once or twice, the customer is required to undertake no further mental processing to deal with them. Thus, these options do not distract the customer from the task of selecting the other options.

These navigational options allow the customer to (1) repeat the three options just presented and (2) move around in the flow chart of FIG. 5. As to the latter, at any level, the customer is given the option of moving to a previous level.

For example, continuing the pizza restaurant example, the following options may be presented to the customer: "To order a small pizza, press 1. To order a medium pizza, press 2. To order a large pizza, press 3. To repeat these options, press 4. To move back one level, press 5. To move ahead one level, press 6." The term "level" refers to the rows, or ranks, of options, such as row 300 in FIG. 5.

2. If a customer is allowed to navigate through the flow chart, several alternate approaches are possible. One is that, at the first level, the option of moving back one level is not presented, because that would be impossible. Alternately, the customer is informed that the customer resides at the first level, and cannot move back.

Another is that a customer is not allowed to move forward, unless the customer has been to the destination level already. That is, a customer must have chosen to move backward, prior to moving forward, in order to move forward at all.

For example, if a customer moves from level 4 to 5, and then returns to 4, the customer is allowed to move to level 5. But if a customer merely arrives at level 3, the customer is not allowed to move to level 5. One reason is to prevent confusion to the customer. A preceding level will be conceptually related to a succeeding level in informational content. In the pizza restaurant analogy, if level 1 asks the type of food the customer wishes to order (pizza, hot sandwiches, cold sandwiches), it would make no sense to allow the customer to jump to a level which presents options based on the presumption that the customer had ordered a specific type of hot sandwich. Such options would be, for example, asking the customer whether ketchup, mustard and pickles are desired. Those options may be appropriate for a particular sandwich, but not a pizza.

3. It may not make sense to present the navigational option of repeating the currently presented options, when the customer utilizes a computer. That is, the currently available options are presently displayed on the customer's computer display. There is no need to repeat them. However, for consistency with the audio interface, where such a permanent display is absent, the option of repeating the currently displayed options is made available.

Figure 6:
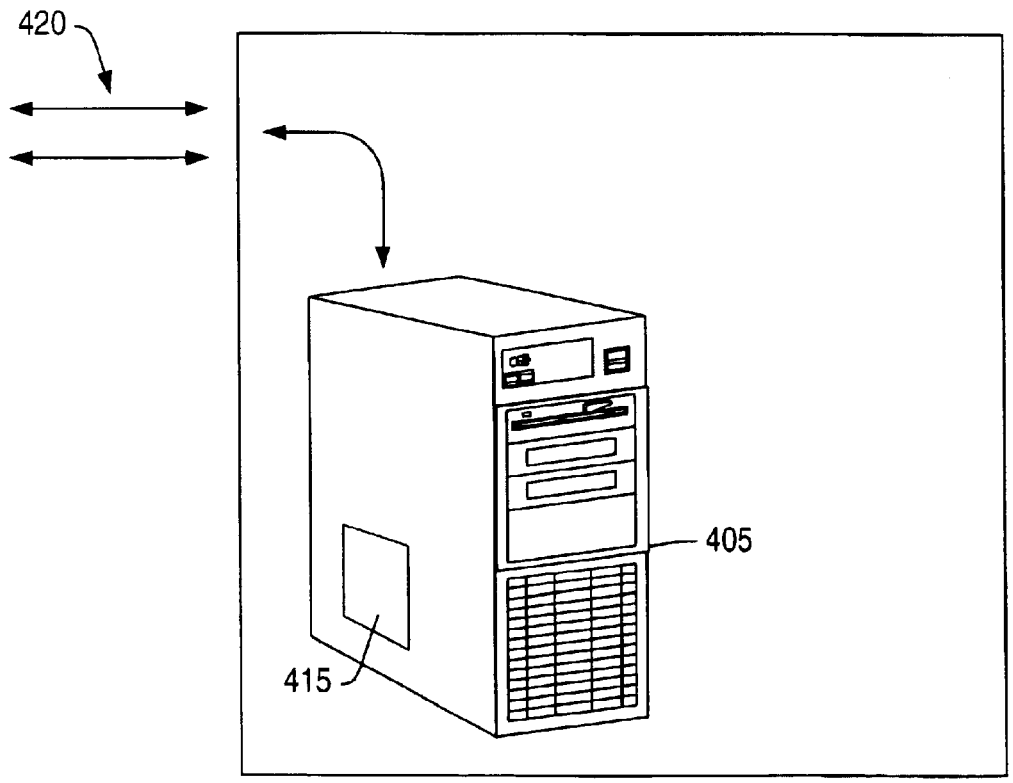
FIG. 6 illustrates one form of the invention.

4. FIG. 6 illustrates a building 400, containing a computer server 405. One or more communication channels 420 are used. The server 405 contains programming and communication hardware, generally indicated as 415, which perform the tasks discussed herein. Specifically, the same server 405 acts as a web site on the Internet, and also acts as a call center, which presents audio options in the manner described above. Equipment, represented by block 415, is commercially available to provide the functionality of a call center.

Alternately, two systems may be used. A web site may be maintained, as by contracting with an Internet Service Provider. In this case, the physical server which maintains the web pages is not located at the site of the organization undertaking communication with the customers, such as the exemplary pizza restaurant.

The second system is the call center, which receives telephone calls and presents options to the callers, and which preferably resides at the site of the exemplary restaurant.

Again, both systems present the same flow chart of information. One presents the information visually, and the other presents the information audibly. A third system can be provided, which presents both visual and audible information. The latter systems are known in the art.

5. A primary focus of the invention is to handle communications with the general public.

6. As stated above, both forms of presentation, audible and visual, follow the same flow chart. However, it should not be assumed that the navigation through the flow chart will be the same by all customers. Different customers will, of course, take different paths through the different flow charts.

Numerous substitutions and modifications can be undertaken without departing from the true spirit and scope of the invention. What is desired to be secured by Letters Patent is the invention as defined in the following claims.

What is claimed is:

1. A method of dealing with remote parties, comprising the following steps:
   a) maintaining a web page on the Internet, which presents information, in a visual format to visitors to the web page, the visual format presenting an interface similar to one presented by a conventional telephone:
      i) at least two options, A and B;
      ii) at least two further options C and D, when option A is selected; and
      iii) at least two further options E and F, when option B is selected;
   b) maintaining a telephone call center accessible to callers using a conventional telephone, which presents, in audible format to callers and which is selectable using inputs that are produced using a conventional telephone, a format for presentation being similar to and coordinated with the visual format used for presentation to visitors to the web page so that the presentation of the audible format experienced by callers to the call center will be similar to the visual format experienced by visitors to the web page,
      i) said options A and B;
      ii) said further options C and D, when option A is selected; and
      iii) said further options E and F, when option B is selected.

2. A method of dealing with remote parties, comprising the following steps:
   a) transmitting a web page which presents
      i) visual options, for selection by a remote party, the visual options being presented in a format presenting an interface similar to one presented by a conventional telephone,
      ii) in a sequence which follows a predetermined flow chart; and
   b) transmitting information which presents audible options, for selection by a different remote party, in a sequence which follows said flow chart, the audible options being accessible by a caller using a conventional telephone and selectable using inputs that are produced using a conventional telephone, the format for presentation being similar to and coordinated with a visual format used for presentation so that a presentation of an audible format experienced be callers will be similar to the format of the visual options presented to the remote party.

3. A system for dealing with remote parties, comprising
   a) means for maintaining a web page on the Internet, which presents, in visual format to visitors to the web page, the visual format presenting an interface similar to one presented by a conventional telephone:
      i) at least two options, A and B;
      ii) at least two further options C and D, when option A is selected; and
      iii) at least two further options E and F, when option B is selected;
   b) a telephone call center accessible to callers using a conventional telephone, which presents, in audible format to callers and which is selectable using inputs that are produced using a conventional telephone, the format for presentation being similar to and coordinated with the visual format used for presentation to visitors to the web page so that the presentation of the audible format experienced by callers to the call center will be similar to the visual format experienced by visitors to the web page,
      i) said options A and B;
      ii) said further options C and D, when option A is selected; and
      iii) said further options B and F, when option B is selected.

4. A system for dealing with remote parties, comprising:
   a) means for transmitting a web page which presents
      i) visual options, for selection by a remote party, the visual options being presented in a format presenting an interface similar to one presented by a conventional telephone,
      ii) in a sequence which follows a predetermined flow chart; and
   b) means for transmitting information which presents audible options, for selection by a different remote party, in a sequence which follows said flow chart, the audible options being accessible by a caller using a conventional telephone and selectable using inputs that are produced using a conventional telephone, the format for presentation being similar to and coordinated with a visual format used for presentation so that a presentation of an audible form at experienced by callers will be similar to the format of the visual options presented to the remote party.

5. A method, comprising:
   a) maintaining a web site which
      i) visually presents a set of options in a web page, including options A, B, and C, the web page presenting an interface similar to one presented by a conventional telephone, and
      ii) visually presents information IA, IB, and IC, respectively, in response to selection of options A, B, and C by a user; and b) maintaining a telephone answering system accessible using a conventional telephones, for presenting an audible format for presentation of options to a caller, a format for presentation being similar to and coordinated with a visual format used for presentation so that the presentation of the audible format experienced by users of the telephone answering system will be similar to a format of the visual options presented to visitors to the web site, which
  i) audibly presents the options A, B, and C, selectable using inputs that are produced using a conventional telephone and
  ii) audibly presents information IA, IE, and IC, respectively, in response to selection of options A, B, and C by a user.

6. A system, comprising:
a) means for maintaining a web page which
  i) visually presents a set of options in a web page, including options A, B, and C, the web page visual options being presented in a format presenting an interface similar to one presented by a conventional telephone and
  ii) visually presents information IA, IB, and IC, respectively, in response to selection of options A, B, and C by a user; and
b) means for maintaining a telephone answering system accessible by callers using a conventional telephone, the format for presentation being similar to and coordinated with a visual format used for presentation so that a presentation of an audible format experienced by callers to the telephone answering system will be similar to the format of the visual options presented to users of the web site, which
  i) audibly presents the options A, B, and C, selectable using inputs that are produced using a conventional telephone and
  ii) audibly presents information IA, IB, and IC, respectively, in response to selection of options A, B, and C by a user.

7. The method of claim 5, wherein at least some of information IA, IB, and IC contain further options.

8. The system of claim 6, wherein at least some of information IA, IB, and IC contain further options.

9. A method, comprising:
a) presenting, in a visual format on a web site, the visual format presenting an interface similar to one presented by a conventional telephone, options A and B, and
  i) responding to a visitor's selection of option A by presenting information IA;
  ii) responding to a visitor's selection of option B by presenting information IB; and
b) presenting, to a telephone caller using a conventional telephone, the format for presentation being similar to and coordinated with the visual format used for presentation so that a presentation of an audible format experienced by callers to the call center will be similar to the format of the visual options presented to visitors to the web site, said options A and B, and
  i) responding to a caller's selection of option A, the selection having been made using inputs that are produced using a conventional telephone, by presenting information IA; and
  ii) responding to a caller's selection of option B, the selection having been made using inputs that can be produced using a conventional telephone, by presenting information IB.

* * * * *

UNITED STATES PATENT AND TRADEMARK OFFICE
CERTIFICATE OF CORRECTION

PATENT NO. : 6,868,523 B1
DATED : March 15, 2005
INVENTOR(S) : Dejaeger, W.

It is certified that error appears in the above-identified patent and that said Letters Patent is hereby corrected as shown below:

Column 6,
Line 55, delete "form at" and substitute -- format --.

Column 7,
Line 2, delete "telephones" and substitute -- telephone --.
Line 19, after "the" delete "web page".

Signed and Sealed this

First Day of November, 2005

JON W. DUDAS
*Director of the United States Patent and Trademark Office*